United States Patent
Bayer et al.

(10) Patent No.: US 7,452,476 B2
(45) Date of Patent: Nov. 18, 2008

(54) METHOD FOR REMOVING COATING FROM POWER UNIT COMPONENTS AND DEVICE FOR CARRYING OUT THE METHOD

(75) Inventors: Erwin Bayer, Dachau (DE); Karsten Gold, Himmelspforten (DE); Albin Platz, Ried-Baindlkirch (DE); Matthias Schmidt, Brehna (DE)

(73) Assignee: MTU Aero Engines GmbH, Munich (DE)

( * ) Notice: Subject to any disclaimer, the term of this patent is extended or adjusted under 35 U.S.C. 154(b) by 373 days.

(21) Appl. No.: 10/385,129

(22) Filed: Mar. 10, 2003

(65) Prior Publication Data

US 2004/0033311 A1 Feb. 19, 2004

(30) Foreign Application Priority Data

Mar. 9, 2002 (DE) ................. 102 10 518

(51) Int. Cl.
*B44C 1/22* (2006.01)
*G01L 21/30* (2006.01)

(52) U.S. Cl. ............... 216/59; 216/65; 219/121.69

(58) Field of Classification Search ............ 216/59, 216/65; 219/121.69
See application file for complete search history.

(56) References Cited

U.S. PATENT DOCUMENTS

| | | | |
|---|---|---|---|
| 4,675,072 A * | 6/1987 | Bennett et al. | 216/60 |
| 4,687,539 A * | 8/1987 | Burns et al. | 216/60 |
| 5,210,944 A * | 5/1993 | Monson et al. | 29/889.2 |
| 5,332,879 A * | 7/1994 | Radhakrishnan et al. | 219/121.69 |
| 5,946,089 A * | 8/1999 | Duer | 356/318 |
| 6,008,896 A * | 12/1999 | Sabsabi et al. | 356/318 |
| 6,114,651 A * | 9/2000 | Schluter et al. | 219/121.69 |
| 6,174,448 B1 * | 1/2001 | Das et al. | 216/2 |
| 6,243,948 B1 * | 6/2001 | Lee et al. | 29/889.1 |
| 6,293,939 B1 * | 9/2001 | Steinert | 606/5 |
| 6,306,246 B1 * | 10/2001 | Melvin et al. | 156/345.25 |
| 6,355,086 B2 * | 3/2002 | Brown et al. | 75/235 |
| 6,365,061 B1 * | 4/2002 | Damer et al. | 216/65 |
| 6,366,353 B1 * | 4/2002 | Brown et al. | 356/318 |
| 6,630,645 B2 * | 10/2003 | Richter et al. | 219/121.71 |
| 2003/0085203 A1 * | 5/2003 | Nair et al. | 219/121.6 |

FOREIGN PATENT DOCUMENTS

| | | |
|---|---|---|
| DE | 44 11 677 | 10/1995 |
| DE | 44 27 259 | 2/1996 |
| DE | 195 19 150 | 12/1996 |
| DE | 197 15 702 | 10/1998 |
| EP | 0 642 846 | 3/1995 |
| WO | WO-01/43912 A1 * | 6/2001 |

* cited by examiner

*Primary Examiner*—Shamim Ahmed
(74) *Attorney, Agent, or Firm*—Kenyon & Kenyon LLP

(57) ABSTRACT

A method for the selective removal of one or more layers from a power unit component, e.g., a turbine blade of a heavy-duty turbine, using high-energy radiation of such a wavelength that the supplied energy is so strongly absorbed by the layer to be removed in each case that the removal threshold of the specific material of the layer to be removed is exceeded, while this removal threshold is not reached in the subsurface to be preserved, a spectrometer connected to a control unit via a light-conducting fiber cable such that the method-specific characteristic values are determinable by spectroscopic methods during the removal of the respective layer and are used for the self-regulating process limitation.

11 Claims, 1 Drawing Sheet

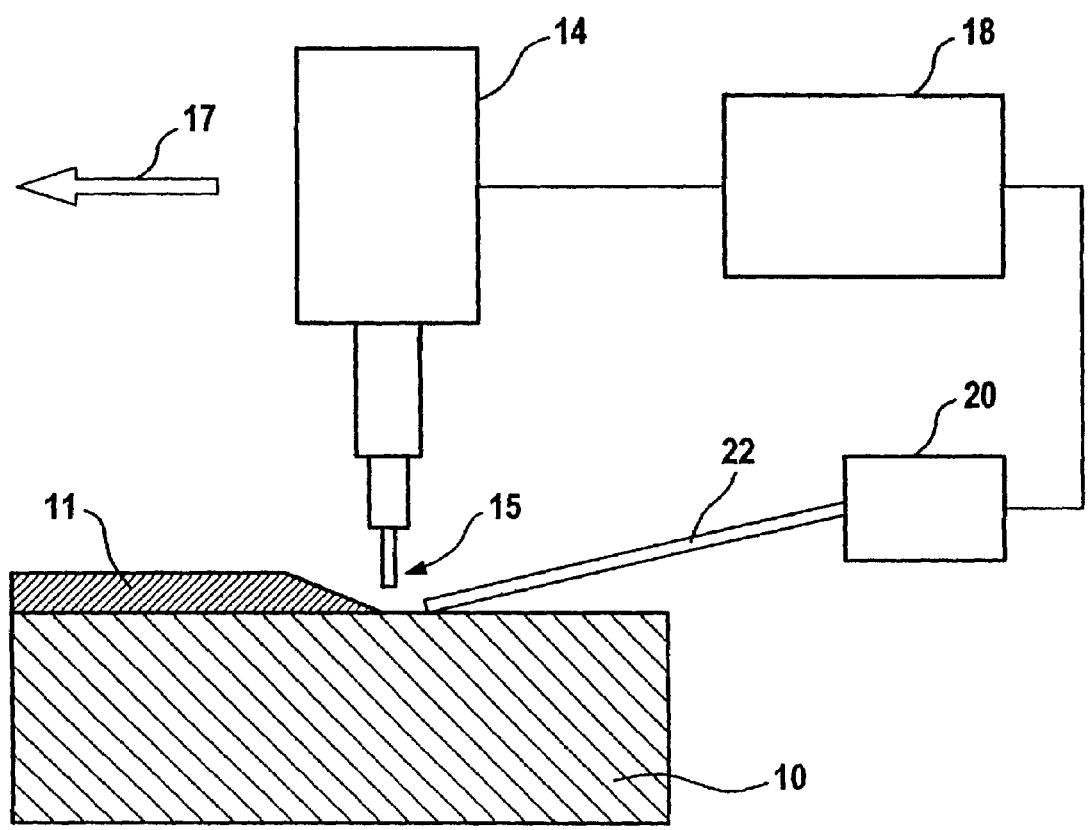

METHOD FOR REMOVING COATING FROM POWER UNIT COMPONENTS AND DEVICE FOR CARRYING OUT THE METHOD

CROSS-REFERENCE TO RELATED APPLICATIONS

The present application claims priority to Application No. 102 10 518.9, filed in the Federal Republic of Germany on Mar. 9, 2002, which is expressly incorporated herein in its entirety by reference thereto.

FILED OF THE INVENTION

The present invention relates to a method for removing coating from power unit components and a device for carrying out the method.

BACKGROUND INFORMATION

After predefined operating times, power unit components, particularly of heavy-duty power units such as turbine blades, produced in composite construction must be stripped down to the base material, to be able to subsequently recoat it for further use.

Conventionally, the coating is removed using wet chemical processes. The base materials of such turbine blades are nickel-based, cobalt-based and titanium-based alloys, while the coatings to be applied are made of corrosion-resistant nickel-aluminum alloys, nickel-chromium-aluminum alloys, MCrAlY alloys (M=nickel, cobalt, nickel-cobalt alloy or iron) or a platinum-aluminum alloy. When removing these coatings by wet chemical processes, the danger exists that upon reaching the base material, it will be partially removed or chemically attacked, because the base material and the coating are very similar in their chemical composition. An attack on the base material during coating removal using wet chemical processes is not even avoidable by process analytics, since the extent of unwanted surface removal is only determinable using measuring-technique measures after the stripping process has ended, so that it is necessary to restrict the frequency of coating removal when using these methods. Moreover, such wet chemical processes are ecologically dangerous. They require a high expenditure for the necessary occupational safety and health measures and the disposal of the process agents in a manner compatible with the environment.

It is an object of the present invention to provide a method and device that may strip such power unit components better and more precisely, while avoiding the wet chemical methods.

SUMMARY

The above and other beneficial objects of the present invention may be achieved by providing a method and device as described herein.

In an example embodiment according to the present invention, the selective removal of layers from a subsurface to be preserved is performed using a laser beam method, e.g., as described in German Published Patent Application No. 197 15 702 in a further developed form, or by a high-energy plasma-pulse method, so that it is usable for the process-controlled removal of coating from power unit components.

According to an example embodiment of the present invention, both in the case of the laser beam method and for the high-energy plasma-pulse method, the process of material removal is constantly monitored by a spectrometer during the stripping operation. The spectrometer may be allocated a fiber line as a coupling element for observing the radiation from the layer to be removed.

Further features and aspects of the present invention are described below.

The method for removing coatings—e.g., metallic coatings—from power unit components may provide a number of advantages. Thus, disadvantages of the ecologically and economically doubtful wet chemical methods do not apply. Optimization and precise determination of the material removal may be possible by the constant process monitoring via the spectrometer, and may be able to be implemented in an economical manner, which may lead to better quality assurance and shortening of production cycle times. The spectrometer analyzes the light emission caused by the irradiated laser or plasma radiation. The radiation is characteristic for the material removed. Since when using the high-energy plasma-pulse method, in contrast to the laser, in each case an area of up to a few square centimeters is acted upon and stripped simultaneously, the coating-removal process may be performed extremely efficiently.

To completely strip a component having a 3D geometry with precision accuracy, the component may be received and moved on a multi-axis motion unit, e.g., a robot.

By the simultaneous removal and analysis of the material removed, an image of the component surface to be stripped may be produced as a concentration profile of one or more elements contained in the coating or base material, based upon which the further stripping process may be controlled. Upon reaching a predetermined, preset concentration threshold, the coating removal process may be terminated.

Removal of material from the base material of the component to be stripped may thereby be avoided with great reliability. Furthermore, occupational safety and health measures may be implemented substantially more easily than when working with removal methods using wet chemicals.

An exemplary embodiment of the present invention is illustrated schematically in the drawing.

BRIEF DESCRIPTION OF THE DRAWING

The FIGURE is a schematic view of an example embodiment of a device according to the present invention.

DETAILED DESCRIPTION

A suitably clamped power unit component 10, e.g., a turbine blade, made of a nickel-based alloy, has a single-layer or multilayer coating 11 made of a layer of the type MCrAlY that is resistant to hot-gas corrosion, and a ceramic $ZrO_2$ heat-insulating layer. An energy source 14 is assigned a beam head (laser or plasma source) 15 having the exit window of the high-energy radiation, the beam head being movable in the direction of arrow 17—the feed or advance direction.

Also allocated to energy source 14 is a control unit 18, having a computer, for regulating the energy output, which is connected to a spectrometer 20. A fiber line 22 may be used as a coupling element between coating 11 to be removed and spectrometer 20.

Depending on the application, the energy source may take the form, for example, of a laser energy source or a high-energy plasma-pulse source.

The layers to be removed have differences in their chemical composition with respect to the material of the turbine blades, which may be made of nickel-based alloys and are coated with metallic, corrosion-resistant intermediate layers (e.g., PtAl diffusion layer, MCrAlY applied protective layer), as well as further functional layers such as, for example, a ZrO$_2$ heat-insulating layer. If, at this point, the coating removal is begun, then the layer material is removed by vaporizing the zones close to the surface in each instance. A signal in the form of an emitted light ray from the laser or plasma treatment, which is proportional to the concentration of one or more elements in the material of the layer to be removed, is transmitted via the fiber coupling to the spectrometer. The evaluation of the signals, thus the specific ascertainment of the concentration of the removed elements and the allocation of the material, is performed in the computer series-connected to the spectrometer.

During the removal of the layers, a change of the spectra obtained takes place, which is detectable because of the change of concentration of the layer. The material-specific concentration profiles of the material from which component 10 to be coated is made, as well as the profiles of the layer or layers of coating 11 to be removed, are stored in the memory locations allocated to the computer of the control unit. By comparing the stored spectra and the spectra ascertained during removal of the layers, given sufficient spectra equality, the respective switchover or termination criterion is determined, so that either the energy input is adaptable to the material-specific properties of the layer to be removed in each case, or else the respective material removal is able to be interrupted.

Thus, if, when stripping component 10, the preset spectrum of the material is detected at which the process should be stopped, then it may either be a complete stripping of the component, or else may correspond to stripping up to a desired removal within the diffusion zone, for example, in the case of diffusion protective layers. Damage to the base material because of too strong a material removal may thereby be safely avoided. To ensure the material-removal interruption demanded in each case, the data from the spectrometer may be transferred online into the computer of the control unit.

The energy feed onto component 10 is terminated by interrupting the energy feed for the radiation source.

The radiation supplied may have so high an intensity that the material to be removed is predominantly vaporized. So as not to damage the material arranged under it by the introduction of heat energy, the single pulse may be very short.

What is claimed is:

1. A method for selective removal of at least one layer from a component subsurface to be preserved for process-controlled removal of coatings from power unit components, comprising:
    providing high-energy radiation of a wavelength that is so strongly absorbed by the layer to be removed in each case that a removal threshold of a material of the layer to be removed is exceeded while a removal threshold in the subsurface to be preserved is not reached, removal of each layer emitting a spectrum of light corresponding to the material being removed; and
    determining material-specific characteristic values during removal of each layer spectroscopically by comparing the spectrum of light emitted during removal of each layer with stored spectra.

2. The method according to claim 1, wherein the providing step includes removing individual layers from a base material of the component with laser beams.

3. The method according to claim 1, wherein the providing step includes removing individual layers from a base material of the component with high-energy plasma-pulsing.

4. The method according to claim 1, further comprising interrupting coating removal by at least one of interrupting energy supply and changing one of a position of an exit opening of the radiation of an energy source and a position of the component.

5. The method according to claim 1, wherein the providing step includes at least one of (a) removing individual layers from a base material of the component with laser beams and (b) removing individual layers from a base material of the component with high-energy plasma-pulsing.

6. The method according to claim 1, wherein the power unit component corresponds to a turbine blade.

7. The method according to claim 1, wherein the stored spectra include spectra of the material of each layer to be removed.

8. The method according to claim 1, wherein the stored spectra include spectra of (a) the material of each layer to be removed and (b) a material of the component subsurface.

9. A method for selective removal of at least one layer from a component subsurface to be preserved for process-controlled removal of coatings from power unit components, comprising:
    removing each layer to be removed by high-energy radiation, the high-energy radiation having a wavelength that is so strongly absorbed by the layer to be removed that a removal threshold of a material of the layer to be removed is exceeded while a removal threshold of a subsurface to be preserved is not exceeded, the removal of each layer emitting a spectrum of light corresponding to the material being removed; and
    determining material-specific characteristic values during removal of each layer spectroscopically by comparing the spectrum of light emitted during removal of each layer with stored spectra.

10. The method of claim 1, wherein the material-specific characteristics values include a concentration of removed elements, the method further comprising stopping the removal when the concentration of the removed elements reaches a predetermined threshold.

11. The method of claim 9, wherein the material-specific characteristics values include a concentration of removed elements, the method further comprising stopping the removal when the concentration of the removed elements reaches a predetermined threshold.

* * * * *